(12) United States Patent
Yamada et al.

(10) Patent No.: US 8,267,479 B2
(45) Date of Patent: Sep. 18, 2012

(54) VEHICLE SEAT FRAME

(75) Inventors: Yukifumi Yamada, Toyota (JP);
Hiroyuki Okazaki, Chiryu (JP); Naoki Goto, Tokai (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 327 days.

(21) Appl. No.: 12/670,358

(22) PCT Filed: Oct. 22, 2008

(86) PCT No.: PCT/JP2008/069115
§ 371 (c)(1),
(2), (4) Date: Jan. 22, 2010

(87) PCT Pub. No.: WO2009/066533
PCT Pub. Date: May 28, 2009

(65) Prior Publication Data
US 2010/0187886 A1 Jul. 29, 2010

(30) Foreign Application Priority Data
Nov. 20, 2007 (JP) .................................. 2007-300101

(51) Int. Cl.
*A47C 7/02* (2006.01)
(52) U.S. Cl. ................. 297/452.18; 297/452.2; 297/468; 297/486
(58) Field of Classification Search ............. 297/452.18, 297/452.2, 354.1, 488, 468
See application file for complete search history.

(56) References Cited

U.S. PATENT DOCUMENTS

| 4,890,888 | A | | 1/1990 | Kostin | |
|---|---|---|---|---|---|
| 5,050,932 | A | | 9/1991 | Pipon et al. | |
| 5,564,785 | A | * | 10/1996 | Schultz et al. | 297/452.2 |
| 5,746,476 | A | * | 5/1998 | Novak et al. | 297/216.13 |
| 5,788,331 | A | * | 8/1998 | Aufrere et al. | 297/452.18 |

(Continued)

FOREIGN PATENT DOCUMENTS
EP 0 283 361 A1 9/1988
(Continued)

OTHER PUBLICATIONS

Extended Search Report dated May 9, 2011, issued by the European Patent Office in corresponding European Patent Application No. 08 85 1445.

(Continued)

*Primary Examiner* — David Dunn
*Assistant Examiner* — Erika Garrett
(74) *Attorney, Agent, or Firm* — Buchanan Ingersoll & Rooney PC

(57) ABSTRACT

A vehicle seat frame is provided, wherein the back center frame of the seat back frame is of hollow, quadrangular prism shape. The connecting member includes a cylindrical outer cylinder portion, a ceiling portion projecting inwardly from one axial end of the outer cylinder portion and a flange portion projecting outwardly from the other axial end of the outer cylinder portion. The ceiling portion of the connecting member is fixed to an inner surface of one of the side plate portions of the back center frame and a surface of the outer cylinder portion side of the flange portion is fixed to an outer surface of the other of the side plate portions of the back center frame, and the other surface opposite to the surface of the outer cylinder portion side of the flange portion is connected to the bracket through the recliner.

9 Claims, 11 Drawing Sheets

U.S. PATENT DOCUMENTS

| | | | | |
|---|---|---|---|---|
| 5,988,756 | A  * | 11/1999 | Aufrere et al. | 297/452.18 |
| 6,189,975 | B1 * | 2/2001 | Okazaki et al. | 297/452.18 |
| 6,817,672 | B2 * | 11/2004 | Matsunuma | 297/452.18 |
| 6,869,145 | B2 * | 3/2005 | Matsunuma | 297/452.18 |
| 6,981,748 | B2 * | 1/2006 | Garnweidner et al. | 297/452.18 |
| 7,887,137 | B2 * | 2/2011 | Fisher et al. | 297/440.2 |
| 7,887,139 | B2 * | 2/2011 | Yamada et al. | 297/452.18 |
| 2002/0135222 | A1 | 9/2002 | Matsunuma | |
| 2003/0062754 | A1 * | 4/2003 | Yamada | 297/354.1 |

FOREIGN PATENT DOCUMENTS

| | | |
|---|---|---|
| FR | 2 712 356 A1 | 5/1995 |
| JP | 9-136610 A | 5/1997 |
| JP | 2002-059770 A | 2/2002 |
| JP | 2002-283891 A | 10/2002 |
| JP | 2003-061777 A | 3/2003 |
| JP | 2003-146121 A | 5/2003 |
| JP | 2004-229688 A | 8/2004 |
| WO | WO 96/38318 | 12/1996 |

OTHER PUBLICATIONS

International Search Report (PCT/ISA/210) for PCT/JP2008/069115 mailed Feb. 17, 2009.

* cited by examiner

VEHICLE SEAT FRAME

TECHNICAL FIELD

This invention relates to a vehicle seat frame provided with a seat cushion frame for supporting a seat cushion, a seat back frame for supporting a seat back and a recliner rotatably connecting the seat back relative to the seat cushion and adjusting the rotational angle thereof.

BACKGROUND OF THE TECHNOLOGY

Conventionally, as shown in FIG. 14, a vehicle seat frame is known, which includes a seat cushion frame 110 supporting a seat cushion 90, a seat back frame 120 supporting a seat back 91, a recliner 140 rotatably connecting the seat back 91 relative to the seat cushion 90 and adjusting the rotation angle thereof and a shoulder belt anchor 130 provided at an upper end of the seat back frame 120. (For example, a vehicle seat frame disclosed in the Patent Document 1). Back side frames 121 and 122 are provided at both sides of the seat back frame 120 and a hollow square prism shaped back center frame 113 is provided at the central portion thereof. Further, cushion side frames 111 and 112 are provided at both sides of the seat cushion frame 110 and a cushion center frame 113 is provided at the central portion thereof. An upper arm 124 formed with a plank is connected to the under portion of the back center frame 113 through bolt means and a lower arm 114 formed with a plank is connected to the upper portion of the back center frame 113 through bolt means. The recliner 140 is provided between the upper arm 124 and lower arm 114. The recliner 140 rotatably connects the upper and lower arms 124 and 114.

Further, a retractor 150 is attached to the seat back frame 120 and one end of a seat belt 151, which is structured with a shoulder belt portion 151a and a lap belt portion 151b, is retracted into the retractor 150. The other end of the seat belt 151 is fixed to an anchor plate 115 attached to the cushion center frame 113 and the middle portion of the seat belt 151 is inserted into a tongue plate 152. This tongue plate 152 is detachably attached to a buckle 116 attached to the cushion side frame 111. It is noted that the vehicle seat frame is a seat frame for two occupants and an explanation of the other seat belt for the other person is omitted.

According to this vehicle seat frame, the seat belt 151 is locked to secure the safety of an occupant seated thereon when the vehicle is suddenly decelerated.
Patent Document 1: JA 2002-59770 A

DISCLOSURE OF INVENTION

Problems to be Solved

However, according to the above conventional vehicle seat frame, the retractor is fixed to the seat back frame and therefore, when the vehicle is suddenly decelerated, the seat belt is locked for secure the occupant whereby a large load is applied on the shoulder belt anchor. The inventors of this application experimented and found that, in such case, the load concentrates at the connecting portion between the back center frame and the upper arm because of a sudden change of the cross section of the connecting portion and, therefore, the connecting portion is the most deformable portion.

The present invention was made in consideration with the above problems and the object of the invention is to provide a vehicle seat frame which can prevent weight increase and secure the strength.

Means for Solving the Problem

The vehicle seat frame of this invention in a first aspect made for solving the above problem features that the vehicle seat frame comprises a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a cylindrical outer cylinder portion, a ceiling portion extending inwardly from one axial end of the outer cylinder portion and a flange portion extending outwardly from the other axial end of the outer cylinder portion and connects the seat cushion frame and the seat back frame, and wherein the connecting member is configured so that the ceiling portion is fixed to an inner surface of one of the opposed side plate portions, a surface of a ceiling portion side of the flange portion is fixed to an outer surface of the other of the opposed side plate portions and that a surface opposite to the ceiling portion side of the flange portion is fixed to an object to be connected, which is either the seat back frame or the seat cushion frame.

The vehicle seat frame of this invention in a second aspect features that, in the first aspect, a shoulder belt anchor for supporting one end of a seat belt is provided at the seat back frame.

The vehicle seat frame of this invention in a third aspect features that, in the first aspect, the recliner is attached to the flange portion of the connecting member and the seat cushion frame and the seat back frame are connected through the recliner.

The vehicle seat frame of this invention in a fourth aspect features that, in the third aspect, the ceiling portion of the connecting member is formed with an annular shape and an inner cylinder portion is accommodated in an inner peripheral portion of the ceiling portion and integrally formed therewith, wherein the other axial end of the inner cylinder portion is fixed to the recliner.

The vehicle seat frame of this invention in a fifth aspect features that the vehicle seat frame comprises a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a ceiling portion having a parallel portion extending in parallel with one of the opposed side plate portions, a pair of side wall portions extending vertically from both side edges of the ceiling portion, respectively and a flange portion extending from the respective tip ends of the side wall portions in parallel with the other of the opposed side plate portions and connects the seat cushion frame and the seat back frame through the recliner, wherein a base end portion side surface of the ceiling portion is fixed to an inner surface of the one of the side plate portions, a base end portion side surface of the flange portion is fixed to an inner surface of the other of the side plate portions and a tip end portion side surface of the flange portion is fixed to the recliner.

The vehicle seat frame of this invention in a sixth aspect features that, in the third aspect, the ceiling portion of the connecting member includes an inclined portion extending with an inclination to the flange portion side from the parallel portion towards the tip end portion side.

The vehicle seat frame of this invention in a seventh aspect features that the vehicle seat frame comprising a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a ceiling portion having a parallel portion extending in parallel with one of the opposed side plate portions, a pair of side wall portions extending vertically from both side edges of the ceiling portion, respectively and a recess portion extending from the base end portion of the ceiling portion towards the tip end portion and formed integrally therewith and connects the seat cushion frame and the seat back frame through the recliner, characterized in that a base end portion side surface of the ceiling portion is fixed to an inner surface of one of the side plate portions, the recess portion is fixed to an inner surface of the other of the side plate portions and a tip end portion side surface of the recess portion is fixed to the recliner.

The vehicle seat frame of this invention in an eighth aspect features that, in the seventh aspect, the recess portion of the connecting member includes a first recess portion provided at the base end portion side, a stepped portion projecting towards the ceiling portion side from the first recess portion and a second recess portion provided at the tip end portion side consecutive with the stepped portion, the second recess portion includes a plurality of engaging bores provided concentrically in the second recess portion and that the recliner includes a corresponding number of engaging projections which are engaged with the plurality of engaging bores to restrict the rotation of the recliner relative to the connecting member, wherein the recliner and the tip end portion side of the side wall portion are fixed.

The vehicle seat frame of this invention in the ninth aspect features that, in the seventh aspect, the ceiling portion of the connecting member includes an inclined portion extending from the parallel portion to the tip end portion side with an inclination relative to the recliner side.

The Effects of the Invention

According to the vehicle seat frame in the first aspect, at least one of the seat cushion frame and the seat back frame has a hollow quadrangular prism shape and the connecting member connecting the seat cushion frame and the seat back frame includes a cylindrical outer cylinder portion, a ceiling portion projecting inwardly from one axial end of the outer cylinder portion and a flange portion projecting outwardly from the other axial end of the outer cylinder portion. The ceiling portion of the connecting member is fixed to an inner surface of one of the opposed side plate portions of the seat back frame (seat cushion frame) and a ceiling portion side surface of the flange portion is fixed to an outer surface of the other of the opposed side plate portions and further, a surface opposite to the ceiling portion side surface is fixed to the seat cushion frame (seat back frame) which is the object to be connected. Thus, the thin seat back frame (seat cushion frame) is extended in a longitudinal direction and the seat back frame and the seat cushion frame are connected by the connecting member at the extended portion. Thus, not only the increase of weight can be avoided, but also a sudden change in cross section at the connecting portion between the seat back frame and the seat cushion frame can be prevented. Accordingly, according to this vehicle seat frame, the weight increase can be prevented and the strength can be assured. Further, since the distance from the position of the seat back frame (seat cushion frame) fixed to the ceiling portion to the axial center is different from the distance from the position of the seat back frame (seat cushion frame) fixed to the flange portion to the axial center, the load applied is not concentrated at the same distance position from the axial center on the same cross section, vertical to a longitudinal direction of the seat back frame (seat cushion frame), thereby to enhance strength of the seat back frame (seat cushion frame).

According to the vehicle seat frame in the second aspect, a shoulder belt anchor is provided at the seat back frame for supporting one end of the seat belt. When a vehicle is suddenly decelerated, a large load is applied on the seat back frame from the shoulder belt through the shoulder belt anchor. Therefore, according to the vehicle frame, the advantage of the increase of strength is enormous.

According to the vehicle seat frame in the third aspect, the recliner is attached to the flange portion of the connecting member and the seat cushion frame and the seat back frame are connected through the recliner. Comparing the structure with a structure having the recliner attached to a different position, the change of cross sections of the seat cushion frame and the seat back frame is small and the strength can be more secured. Further, the number of necessary part becomes less and the increase of weight can be avoided.

According to the vehicle seat frame in the fourth aspect, the ceiling portion of the connecting member is of annular shape and a cylindrical inner cylinder portion is integrally formed with the inner surface of the ceiling portion. The other axial end of the inner cylinder portion is fixed to the recliner, and therefore, the seat back frame (seat cushion frame) and the recliner are securely fixed and accordingly, the seat cushion frame and the seat back frame are securely connected as well.

According to the vehicle seat frame in the fifth aspect, at least one of seat cushion frame and the seat back frame has a hollow quadrangular prism shape and a connecting member for connecting the seat cushion frame and the seat back frame through the recliner includes a ceiling portion having a parallel portion extending in parallel with one of the opposed side plate portions, a pair of side wall portions extending vertically from both side edges of the ceiling portion, respectively and a flange portion extending from the respective tip ends of the side wall portions in parallel with the other of the opposed side plate portions. The base end portion side surface of the ceiling portion is fixed to an inner surface of the one of the side plate portions, a base end portion side surface of the flange portion is fixed to an inner surface of the other of the side plate portions and a tip end portion side surface of the flange portion is fixed to the recliner. Thus, the base end portion side of the connecting member is accommodated in and fixed to the seat back frame (seat cushion frame) and the tip end portion side of the connecting member is connected to the seat cushion frame (seat back frame) through the recliner so that the cross section at the connecting portion between the seat cushion frame and the seat back frame would not suddenly change. Further, since the connecting member is of approximately reverse C-shape in cross section, the increase of weight can be avoided. Accordingly, according to this vehicle seat frame, the increase of weight can be prevented and the strength can be secured.

According to the vehicle seat frame in the sixth aspect, the ceiling portion of the connecting member includes an inclined portion extending from the parallel portion to the tip end portion side inclining relative to the flange portion side. This can enhance the strength and yet the space for the occupant can be assured.

According to the vehicle seat frame in the seventh aspect, at least one of seat cushion frame and the seat back frame has a hollow quadrangular prism shape and a connecting member for connecting the seat cushion frame and the seat back frame through the recliner includes a ceiling portion having a parallel portion extending in parallel with one of the opposed side plate portions, a pair of side wall portions extending vertically from both side edges of the ceiling portion, respectively and a recess portion extending from the base end portion of the ceiling portion towards the tip end portion and formed integrally therewith. The base end portion side surface of the ceiling portion is fixed to an inner surface of the one of the side plate portions and the recess portion is fixed to an inner surface of the other of the side plate portions and a tip end portion side surface of the recess portion is fixed to the recliner. Thus, the base end portion side of the connecting member is accommodated in and fixed to the seat back frame (seat cushion frame) and the tip end portion side of the connecting member is connected to the seat cushion frame (seat back frame) through the recliner so that the cross section at the connecting portion between the seat cushion frame and the seat back frame would not suddenly change. Further, the ceiling portion and the recess portion of the connecting member are integrally formed to prevent the increase of weight. Further, since the base end portion side surface of the ceiling portion is fixed to an inner surface of one of the side plate portions and the recess portion is fixed to the other of the side plate portions, the structure is robust against the load. Accordingly, according to this vehicle seat frame, the increase of weight can be prevented and the strength can be secured.

According to the vehicle seat frame in the eighth aspect, the second recess portion includes a plurality of engaging bores provided concentrically in the second recess portion and the recliner includes the corresponding number of engaging projection engaged with the plurality of engaging bores to restrict the rotation of the recliner relative to the connecting member. Further, since the recliner and the tip end portion side of the side wall portion are fixed, the seat back frame (seat cushion frame) and the recliner are securely fixed and accordingly the seat back frame and the seat cushion frame are securely fixed.

According to the vehicle seat frame in the ninth aspect, the ceiling portion of the connecting member includes an inclined portion extending from the parallel portion to the tip end portion side with an inclination relative to the recliner side thereby to enhance the strength and to assure the occupant's space.

BRIEF EXPLANATION OF ATTACHED DRAWINGS

EXPLANATION OF REFERENCE NUMERALS

10; seat cushion frame, 20; seat back frame, 27; shoulder belt anchor, 30; recliner, 30a; engaging projection, 23a, 23b, 40a, 40b; side plate portion, 32, 42, 60; connecting member, 33; outer cylinder portion, 36; inner cylinder portion, 34, 43, 63; ceiling portion, 43a, 63a; parallel portion, 43a, 43b; inclined portion, 35, 45; flange portion, 44, 64; side wall portion, 65; recess portion, 66; first recess portion, 67; stepped portion, 68; second recess portion, 68b; engaging bore, 90; seat cushion, 91; seat back.

THE BEST MODE EMBODIMENTS OF THE INVENTION

Figure 1:
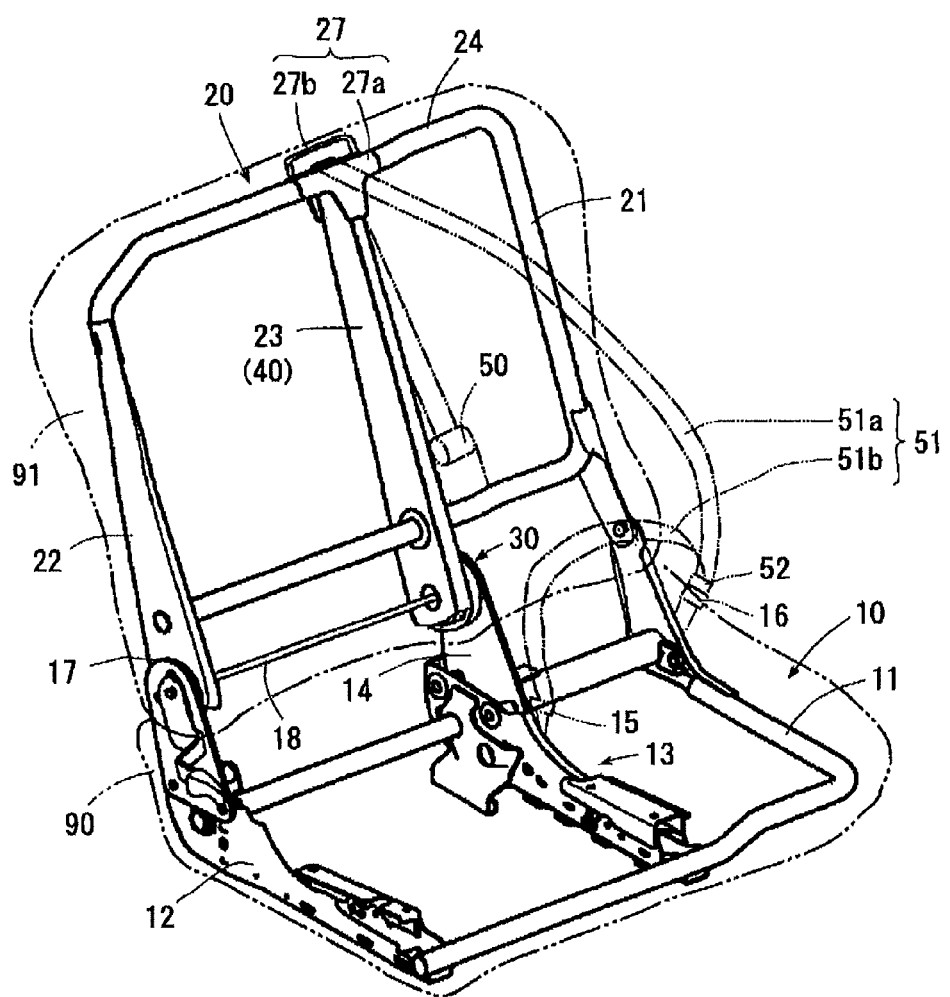
FIG. 1 is a perspective view of a vehicle seat frame according to the embodiments 1, 2 and 3.

The vehicle seat frame according to the embodiments 1 to 3 of the invention will be explained hereinafter with reference to the attached drawings. The vehicle seat frame of the embodiment 1, as shown in FIG. 1, includes a seat cushion frame 10 supporting a seat cushion 90, a seat back frame 20 supporting a seat back 91, a recliner 30 rotatably connecting the seat back 91 relative to the seat cushion and adjusting the relative rotation angle thereof and a shoulder belt anchor 27 provided at an upper portion of the seat back frame 20. The shoulder belt anchor 27 includes a joint portion 27a and a belt guide portion 27b.

Back side frames 21 and 22 are provided at both sides of the seat back frame 20, respectively and a hollow quadrangular prism shaped back center frame 23 is provided at the central portion of the seat back frame 20. Upper end portions of the back side frames 21 and 22 are connected together by an upper pipe 24 and the central portion of the upper pipe 24 is connected to the upper end portion of the back center frame 23 through the joint portion 27a. This joint portion 27a also functions to protect a later explained shoulder belt portion 51a. The belt guide portion 27b is provided at the upper portion of the joint portion 27a for guiding the winding and rewinding of the shoulder belt portion 51a. Cushion side frames 11 and 12 are provided at both ends of the seat cushion frame 10 and a cushion center frame 13 is provided at the central portion of the seat cushion frame 10. A thick plate (plank) bracket 14 is fastened to the upper portion of the cushion center frame 13 by bolts. The recliner 30 is provided between the back center frame 23 and the bracket 14 for rotatably connecting the back center frame 23 and the bracket 14. This recliner 30 is connected to another recliner 17 provided on the back side frame 22 through a connecting shaft 18.

Further, a retractor 50 is attached to the seat back frame 20 and one end of a seat belt 51, formed by the shoulder belt portion 51a and the lap belt portion 51b, is retracted into the retractor 50. The other end of the seat belt 51 is fixed to an anchor plate 15 attached to the cushion center frame 13 and the middle portion of the seat belt 51 is inserted into a tongue plate 52. This tongue plate 52 is detachably attached to a buckle 16 attached to the cushion side frame 11. The portion from the retractor 50 to the tongue plate 52 is defined as the shoulder belt portion 51a of the seat belt 51 and the remaining portion from the tongue plate 52 to the anchor plate 15 is defined as the lap belt portion 51b of the seat belt 51.

Figure 2:
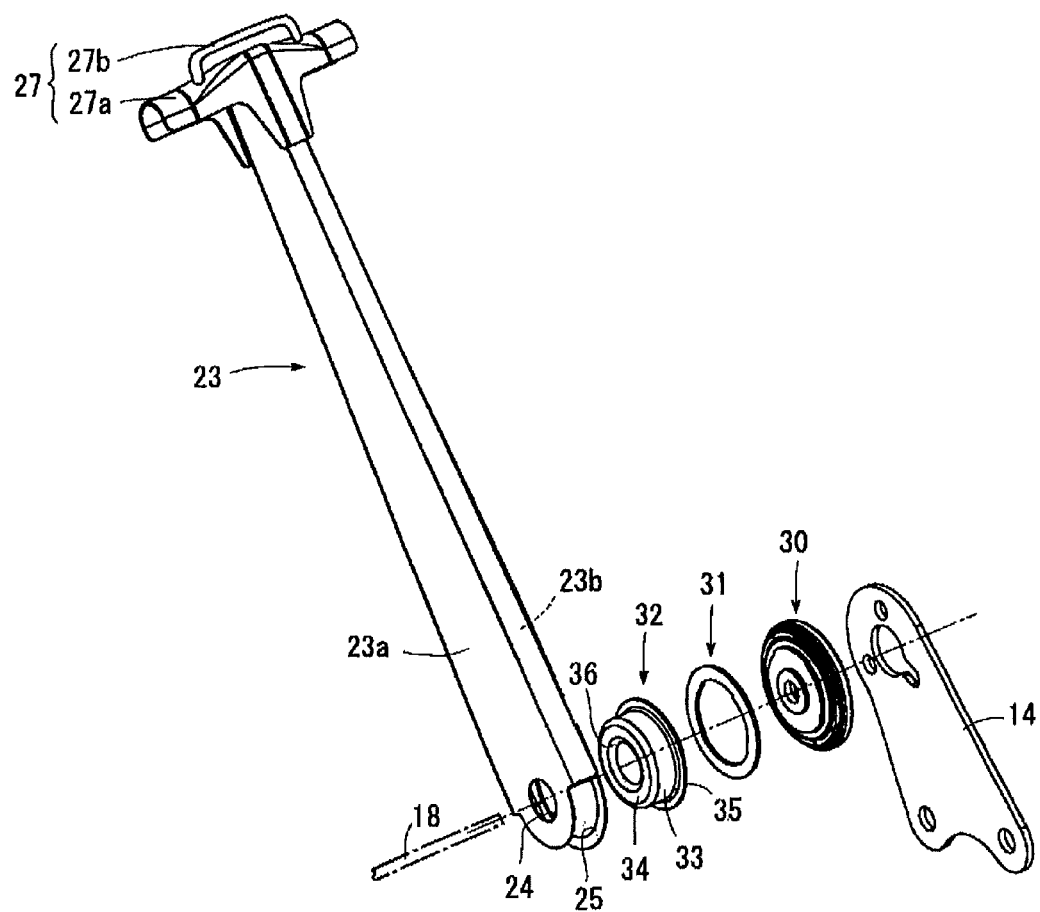
FIG. 2 is an exploded perspective view showing a connecting portion between the back center frame and the bracket of the vehicle seat frame according to the embodiment 1.

FIG. 2 is an exploded perspective view of the connecting portion between the back center frame 23 and the bracket 14. The back center frame 23 is formed by bending a thin steel plate to form a quadrangular prism shape by welding. Widths of the opposing two side plate portions 23a and 23b are widened towards (downward as viewed in FIG. 2) connecting portion with the bracket 14. A shaft bore 24 is provided at the side plate portion 23a for inserting the connecting shaft 18 therethrough and an attaching bore 25 is provided at the side plate portion 23b coaxially with the shaft bore of the side plate portion 23a for attaching the connecting member 32 by placing the connecting member 32 in the back center frame 23.

The connecting member 32 is formed by an outer cylinder portion 33, a ceiling portion 34, a flange portion 35 and an inner cylinder portion 36. The outer cylinder portion 33 is of cylindrical shape and the annular shape ceiling portion 34 extends inwardly from one axial end of the outer cylinder portion 33. The inner cylinder portion 36 is of cylindrical shape and disposed in the inner periphery of the ceiling portion and formed integrally therewith. The inner cylinder portion 36 is coaxially accommodated in the outer cylinder portion 33. The flange portion 35 extends outwardly from the other axial end of the outer cylinder portion 33. An annular attaching piece 31 and the recliner 30 are provided between the connecting member 32 and the bracket 14 for easy attachment of the connecting member 32 and the recliner 30.

Figure 3:
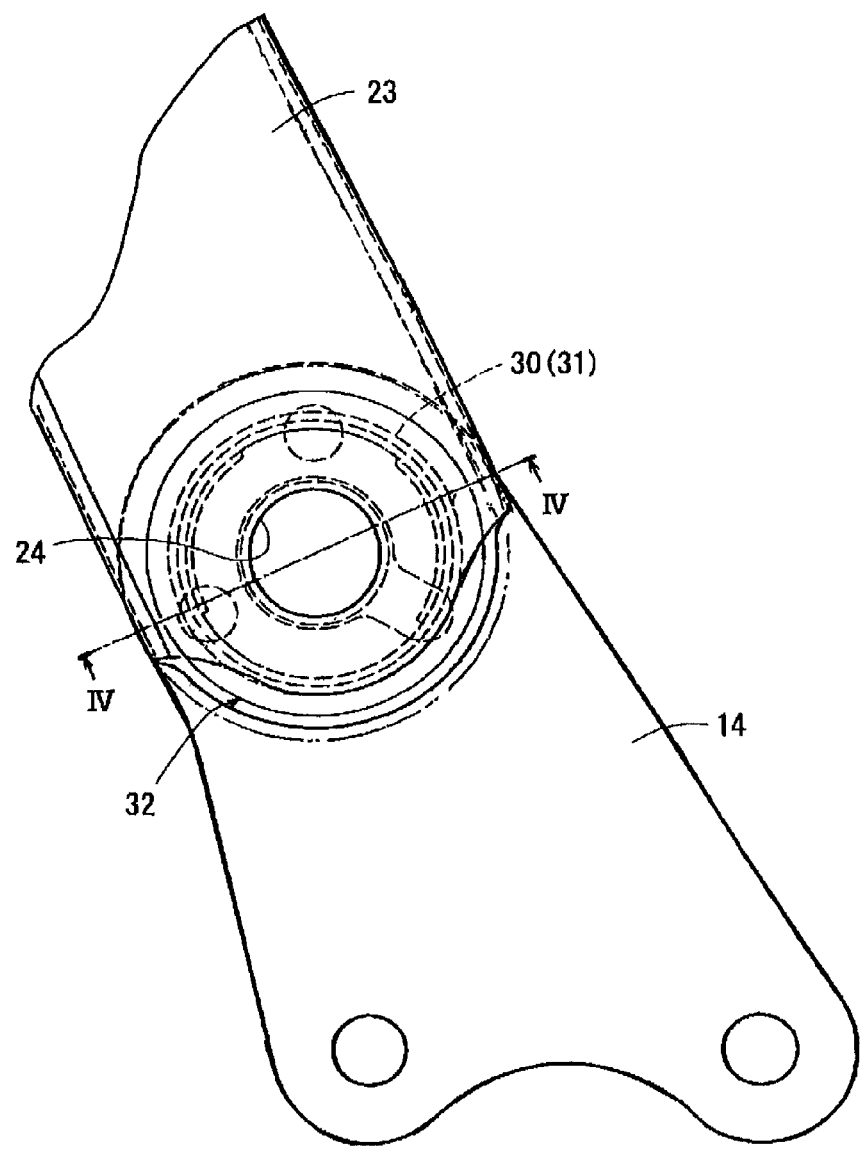
FIG. 3 is an enlarged view of the connecting portion between the back center frame and the bracket of the vehicle seat frame according to the embodiment 1.
Figure 4:
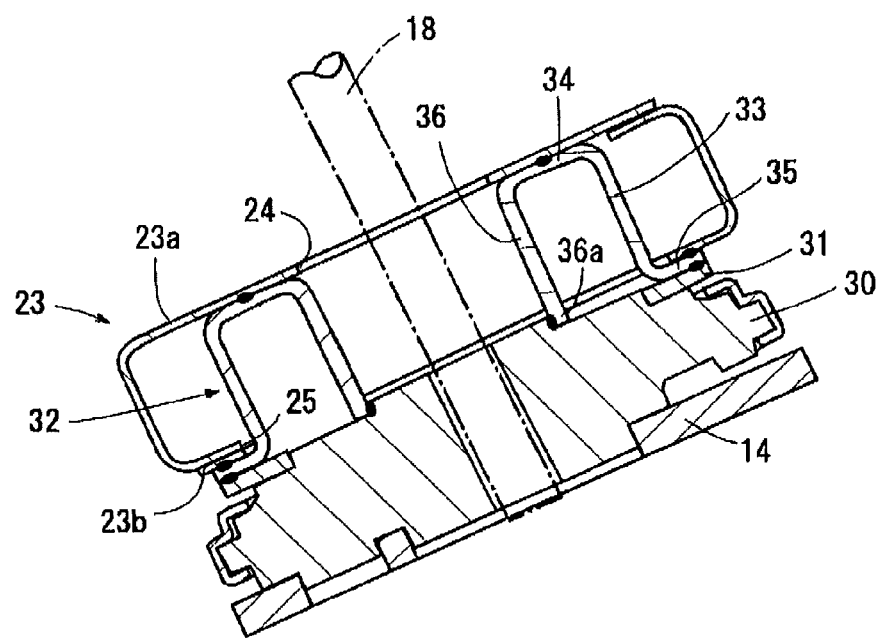
FIG. 4 is a cross sectional view taken along the line IV-IV of FIG. 3, showing the vehicle seat frame according to the embodiment 1.

FIG. 3 and FIG. 4 are enlarged view and cross sectional view of the connecting portion of the back center frame 23 and the bracket 14, respectively. The connecting member 32 is inserted into the back center frame 23 through the attaching bore 25 and the ceiling portion 34 is welded to the side plate portion 23a along the entire periphery. Further, the flange portion 35 of the connecting member 32 is welded to the side plate portion 23b of the back center frame 23 along the entire periphery at the outer cylinder portion 33 side surface and the other side surface of the flange portion 35 opposite to the outer cylinder portion side surface is welded to the attaching piece 31 along the entire periphery thereof. Thus the opposite side surface of the flange portion 35 to the outer cylinder portion side surface thereof is fixed to the seat cushion frame 10. Further, the other end 36a of the inner cylinder portion 36 of the connecting member 32 is welded to the recliner 30 along the entire periphery. The recliner 30 is inserted into the attaching piece 31 and the bracket 14. According to this structure, the back center frame 23 and the bracket 14 are rotatably connected through the recliner 30. It is noted here that a known structure is used for the recliner 30 and the explanation thereof is omitted.

In the vehicle seat frame according to the embodiment 1, the hollow and quadrangular prism shaped thin back center frame 23 extends in a longitudinal direction and at the extended portion the back center frame 23 and the bracket 14 (which is fastened to cushion center frame) are rotatably connected through the connecting member 32. This can prevent not only the increase of weight, but also the sudden change of cross sectional surface at the connecting portion between the back center frame 23 and the bracket 14. Accordingly, the vehicle seat frame according to the embodiment 1 can avoid increase of weight and secure the strength. Since the distance from the position of the side plate portion 23a of the back center frame 23 fixed to the ceiling portion 34 to the axial center is different from the distance from the side plate portion 23b of the back center frame 23 fixed to the flange portion 35 to the axial center, the load is not concentrated at the same distance position from the axial center on the same cross sectional surface vertical to the longitudinal direction of the back center frame 23 to strengthen the rigidity of the back center frame 23.

Further, according to this vehicle seat frame, since the recliner 30 is attached to the flange portion 35 of the connecting member 32 through the attaching piece 31 and the back center frame 23 and the cushion center frame 13 are connected through the recliner 30, the change of the cross sectional surface at the connecting portion between the back center frame 23 and the cushion center frame 13 is small compared to the structure in which the recliner 30 is attached to a different position from this embodiment. This can also more secure the strength and the number of necessary components is less to avoid the increase of weight. However, it is noted that the back center frame 23 and the bracket 14 may be fixed by the connecting member 32 and the bracket 14 and the cushion center frame 13 may be connected through the recliner 30.

Further, according to the vehicle seat frame, the ceiling portion 34 of the connecting member 32 is of annular shape and the inner cylinder portion 36 is integrally formed with the ceiling portion 34 at the inner periphery thereof. The inner cylinder portion 36 is accommodated in the outer cylinder portion 33 and arranged coaxially therewith. The other axial end 36a of the inner cylinder portion 36 is fixed to the recliner 30 to strongly connect the back center frame 23 and the recliner 30 and accordingly the back center frame 23 and the bracket 14 (cushion center frame 13) are securely connected.

According to the embodiment 1, the shoulder belt anchor 27 is provided at the upper end of the seat back frame 20, however, the invention is not limited to this vehicle seat frame and a vehicle seat frame with a shoulder belt anchor provided on the vehicle body is within the scope of this invention. Further, according to the embodiment 1, the inner cylinder portion 36 of the connecting member 32 is accommodated in the outer cylinder portion 33 and arranged coaxially therewith; however, the inner cylinder portion 36 and the outer cylinder portion 33 may not necessarily be arranged coaxially with each other.

Next, the vehicle seat frame according to the embodiment 2 will be explained. Main mechanical structure of this embodiment 2 is approximately the same with the main structure of the vehicle seat frame according to the embodiment 1 shown in FIG. 1, and therefore, the same reference numerals are used for the same components and explanation thereof will be omitted.

Figure 5:
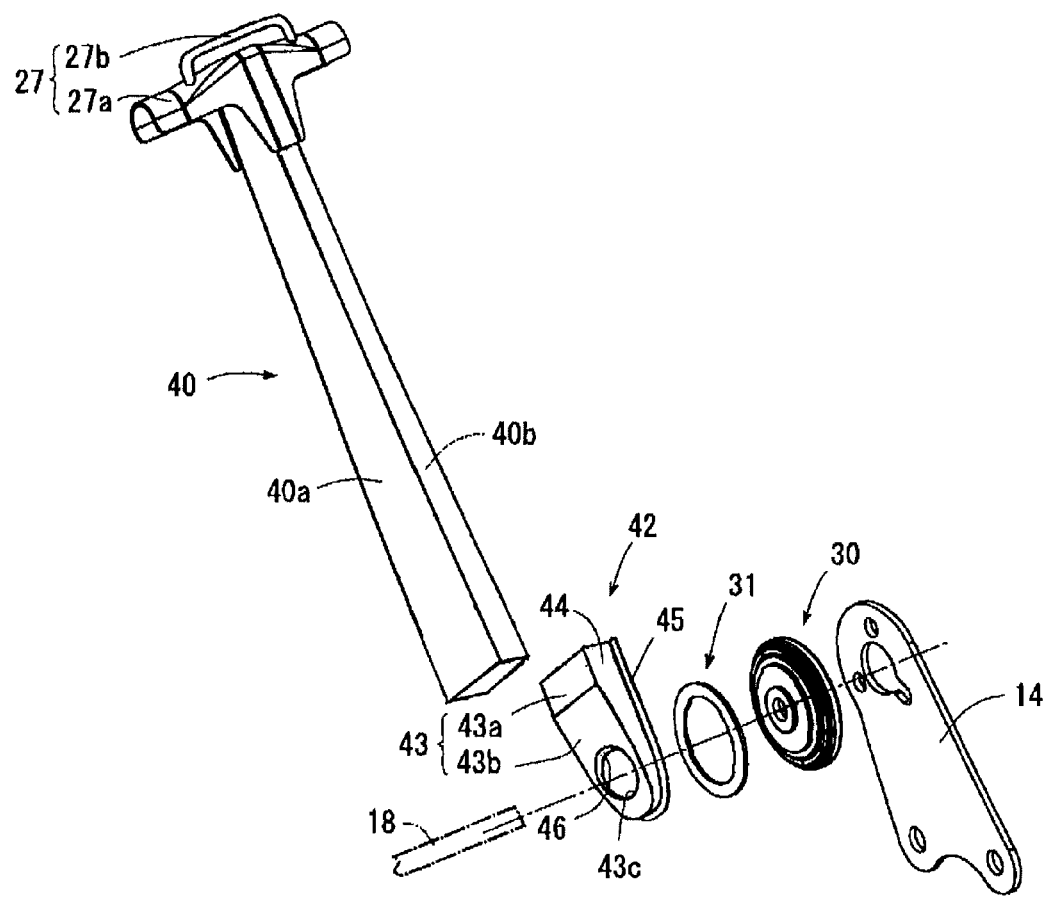
FIG. 5 is an exploded perspective view showing a connecting portion between the back center frame and the bracket of the vehicle seat frame according to the embodiment 2.

FIG. 5 is an exploded perspective view of the connecting portion of the back center frame 40 and the bracket 14. The back center frame 40 is formed by bending a thin steel plate to form a quadrangular prism shape by welding. Widths of the opposing two side plate portions 40a and 40b are widened towards (downward as viewed in FIG. 5) connecting portion with the bracket 14.

The connecting member 42 includes a ceiling portion 43, a side wall portion 44, a flange portion 45 and a cylinder portion 46. The ceiling portion 43 includes a rectangular parallel portion 43a extending in parallel with a side plate portion 40a and an inclined portion 43b extending with an inclination relative to the flange portion side from the rectangular parallel portion 43a towards the tip end portion side. The side wall portion 44 extends from the both sides of the ceiling portion 43 respectively in a vertical direction and the width thereof is narrowed gradually from the base end portion side towards the tip end portion side. However, one side of the base end portion of the ceiling portion 43 is not provided with a side wall portion 44. The flange portion 45 extends from the tip end of the side wall portion 44 outwardly in parallel with the side plate portion 40b. A shaft bore 43c is provided at the inclined portion 43b of the ceiling portion 43 and the connecting shaft 18 penetrates through the shaft bore 43c. The cylinder portion 46 is integrally formed with and disposed in the peripheral surface of the shaft bore 43c. The cylinder portion 46 extends in a direction vertical to the flange portion 45.

Figure 6:
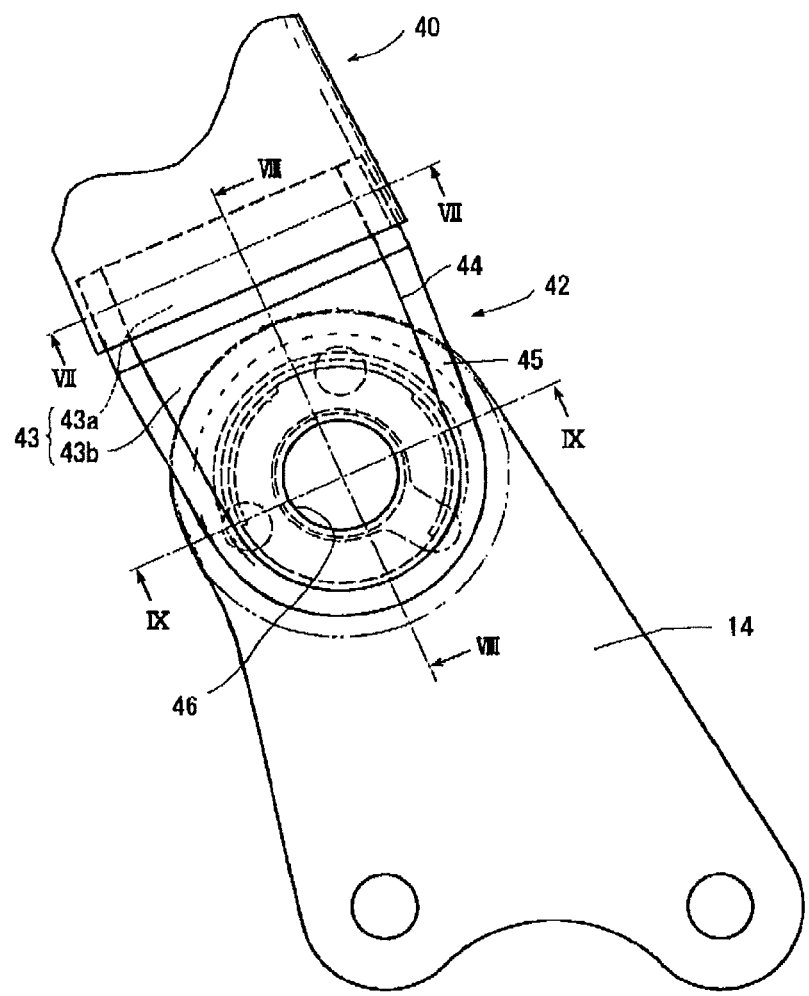
FIG. 6 is an enlarged view of the connecting portion between the back center frame and the bracket of the vehicle seat frame according to the embodiment 2.
Figure 7:
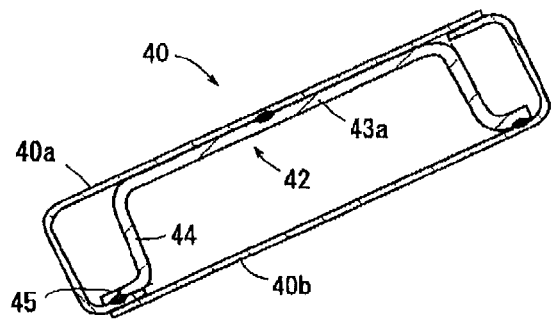
FIG. 7 is a cross sectional view taken along the line VII-VII of FIG. 6, showing the vehicle seat frame according to the embodiment 2.
Figure 8:
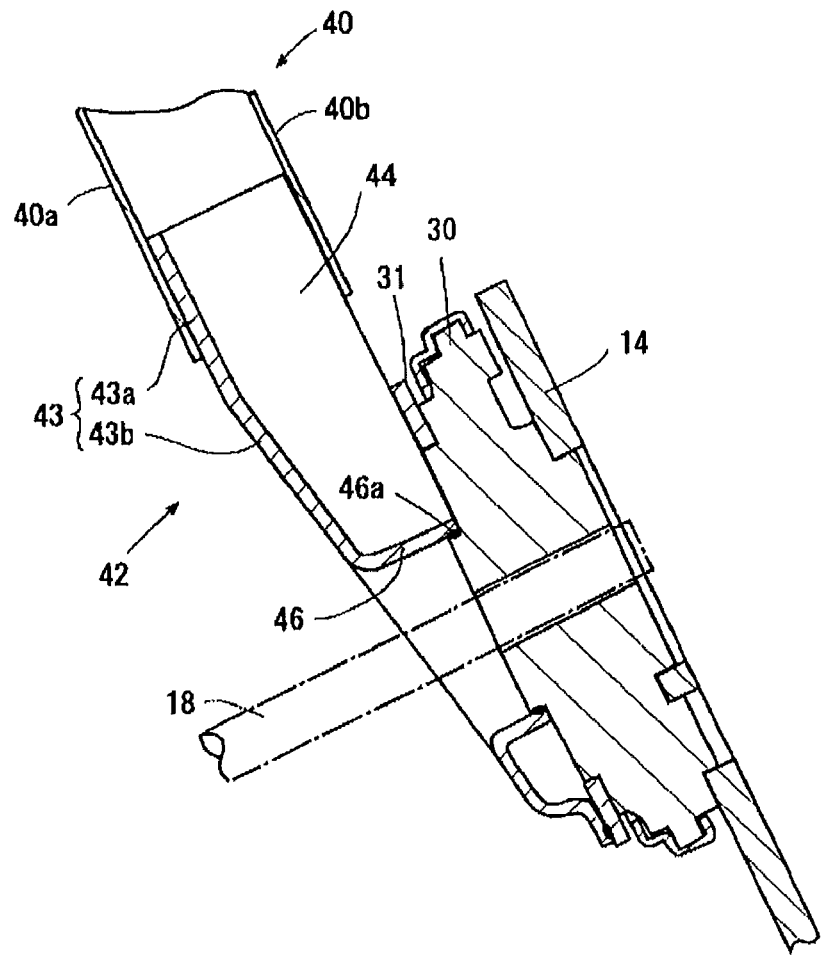
FIG. 8 is a cross sectional view taken along the line VIII-VIII of FIG. 6, showing the vehicle seat frame according to the embodiment 2.
Figure 9:
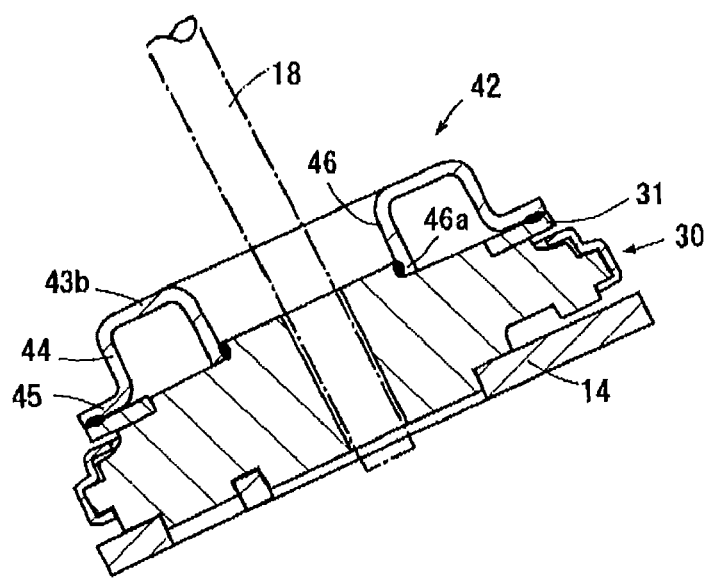
FIG. 9 is a cross sectional view taken along the line IX-IX of FIG. 6, showing the vehicle seat frame according to the embodiment 2.

FIGS. 6 through 9 are enlarged views and cross sectional views of the attachment portion of the back center frame 40 and the bracket 14, respectively. As shown in FIG. 6 and FIG. 7, the base portion side of the connecting member 42 is accommodated in the back center frame 40 and the side plate portion 40a and the parallel portion 43a, and the side plate 40b and the base end portion side of the flange 45 are welded. Further, as shown in FIGS. 8 and 9, the tip end portion side of the flange portion 45 of the connecting member 42 is welded to the attaching piece 31 and the other end 46a of the cylinder portion 46 is welded to the recliner at the entire periphery. The recliner 30 is inserted into the attaching piece 31 and the bracket 14. According to this structure, the back center frame 40 and the bracket 14 are rotatably connected through the recliner 30. It is noted here that a known structure is used for the recliner 30 and the explanation thereof is omitted.

In the vehicle seat frame according to the embodiment 2, the base portion side connecting member 42 is accommodated in and fixed to the hollow and quadrangular prism shaped thin back center frame 40 and the tip end portion side of the connecting member 42 and the bracket 14 (which is fastened to cushion center frame 13) are rotatably connected through the recliner 30 and accordingly, this structure can prevent not only the increase of weight, but also the sudden change of cross sectional surface at the connecting portion between the back center frame 23 and the bracket 14. Further, the connecting member 42 is of approximately reverse C-shape in cross section and increase of weight can be avoided. Accordingly, according to the vehicle seat frame of the embodiment 2, the increase of weight can be prevented and the strength can be secured.

Further, according to this vehicle seat frame, the ceiling portion 43 is provided with an inclined portion 43b extending with inclination to the flange portion 45 from the parallel portion 43a towards the tip end portion side (the width of the side wall portion 44 is narrowed from the base end portion side to the tip end portion side). This can enhance the strength and yet can keep a sufficient space for an occupant of the vehicle.

According to the embodiment 2, the shoulder belt anchor 27 is provided at the upper end of the seat back frame 20, however, as has been explained in the embodiment 1, the invention is not limited to this vehicle seat frame and a vehicle seat frame which has a shoulder belt anchor provided on the vehicle body may be within the invention. Further, according to the embodiment 2, the ceiling portion 43 of the connecting member 42 has the parallel portion 43a and the inclined portion 43b; however it is not necessary to have the inclined portion 43b. Further, according to the embodiment 2, the flange portion 45 extends outwardly from the tip end of the side wall portion 44 of the connecting member 42 in parallel with the side plate portion 40b; however, the flange portion 45 may extend inwardly in parallel with the side plate portion 40b.

Next, the vehicle seat frame according to the embodiment 3 will be explained. Main mechanical structure of this embodiment 3 is approximately the same with the main structure of the vehicle seat frame according to the embodiment 1 shown in FIG. 1 and therefore the same reference numerals are used for the same components and explanation thereof will be omitted.

Figure 10:
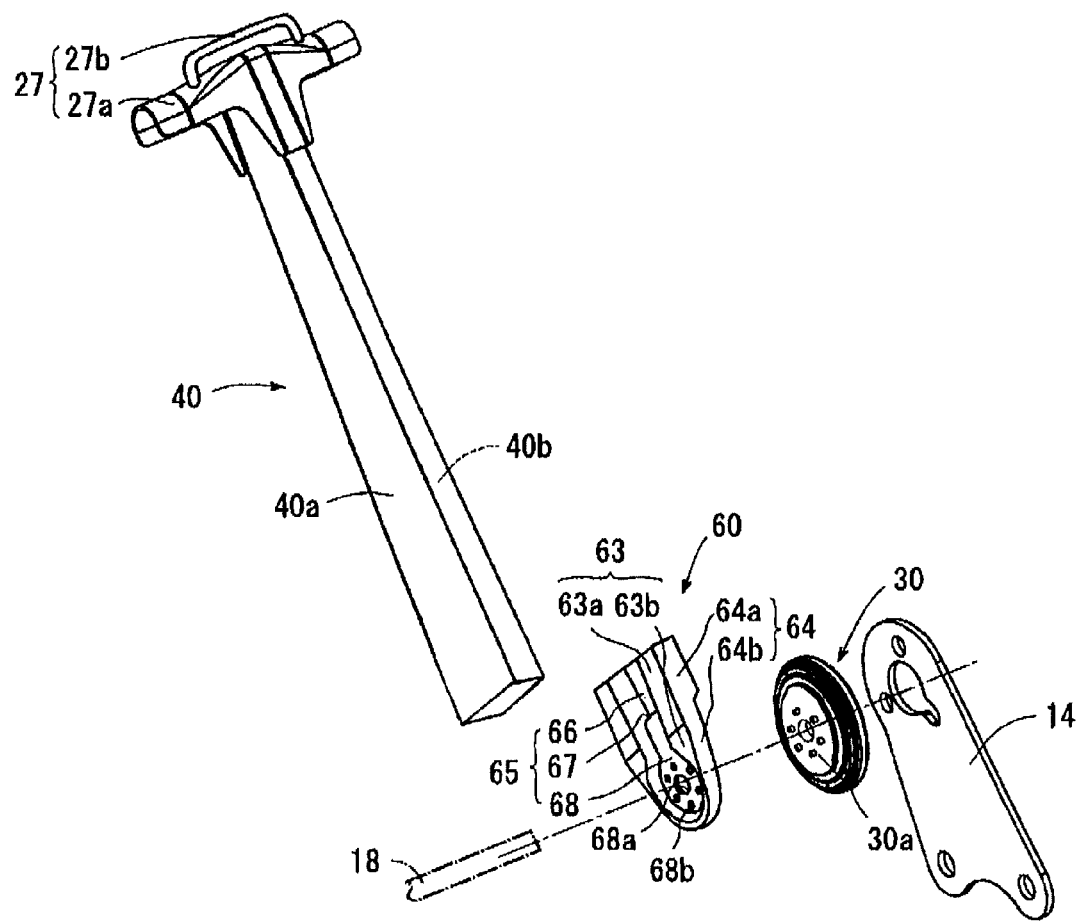
FIG. 10 is an exploded perspective view showing a connecting portion between the back center frame and the bracket of the vehicle seat frame according to the embodiment 3.

FIG. 10 is an exploded perspective view of the connecting portion of the back center frame 40 and the bracket 14. The back center frame 40 is formed by bending a thin steel plate to form a quadrangular prism shape by welding. Widths of the opposing two side plate portions 40a and 40b are widened towards (downward as viewed in FIG. 10) connecting portion with the bracket 14.

The connecting member 60 is press-formed from a steel plate material and includes a ceiling portion 63, a side wall portion 64 and a recess portion 65. The ceiling portion 63 includes a parallel portion 63a extending in parallel with a side plate portion 40a and an inclined portion 63b extending with an inclination relative to the recliner 30 side inserted into the bracket 14, from the parallel portion 63a towards the tip end portion side. The side wall portion 64 extends from the both sides of the ceiling portion 63 respectively in a vertical direction and includes a first side wall portion 64a and a second side wall portion 64b. However, the side wall portion 64 is not provided at the base end portion side of the inclined portion 63b, that is a side connecting the ends of the first side wall portion 64a at both sides.

The first side wall portion 64a extends from the parallel portion 63a bent with a right angle and the second side wall portion 63b extends from a portion of the parallel portion 63a and the inclined portion 63b bent with a right angle. The width of the first side wall portion 64a is wider than that of the second side wall portion 64b. The second side wall portion 64b extends from the first side wall portion 64a of both sides towards the tip end portion side with the width reducing gradually and is bent circularly at the tip end portion and connected thereat.

The recess portion 65 is provided from the base end portion to the tip end portion of the ceiling portion 63. The recess portion 65 includes a first recess portion 66 provided at the base end portion side and a stepped portion 67 projecting towards the ceiling 63 side from the first recess portion 66 and a second recess portion 68 provided at the tip end portion side and formed consecutive to the stepped portion 67. A shaft bore 68a is provided at the second recess portion 68 for inserting the connecting shaft 18 therethrough and a plurality of engaging bores 68b is concentrically provided around the shaft bore 68a. The same number of engaging projections 30a is concentrically provided at the recliner 30 for engaging with the engaging bores 68b.

Figure 11:
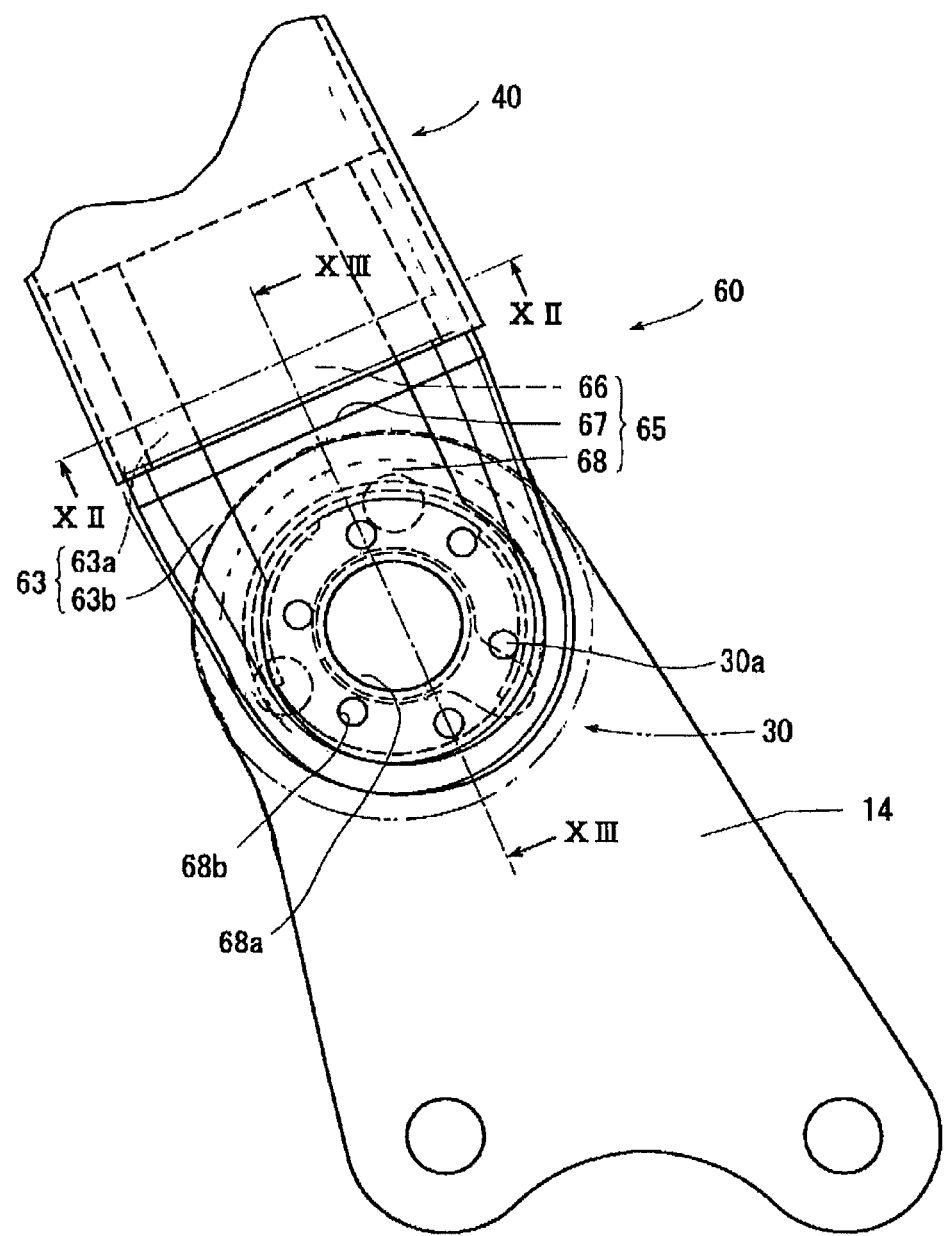
FIG. 11 is an enlarged view of the connecting portion between the back center frame and the bracket of the vehicle seat frame according to the embodiment 3.
Figure 12:
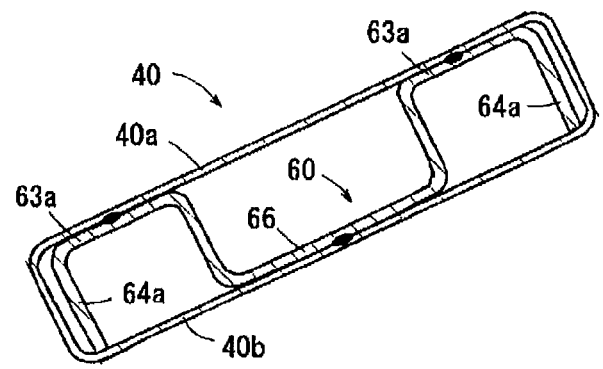
FIG. 12 is a cross sectional view taken along the line XII-XII of FIG. 11, showing the vehicle seat frame according to the embodiment 3.
Figure 13:
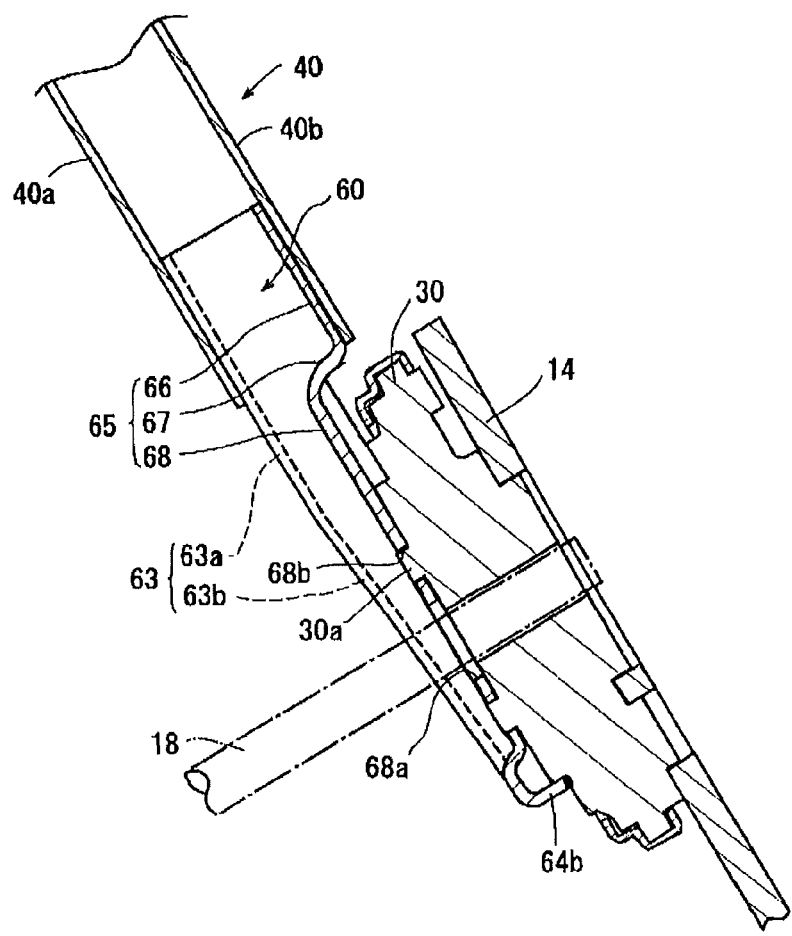
FIG. 13 is a cross sectional view taken along the line XIII-XIII of FIG. 11, showing the vehicle seat frame according to the embodiment 3.
Figure 14:
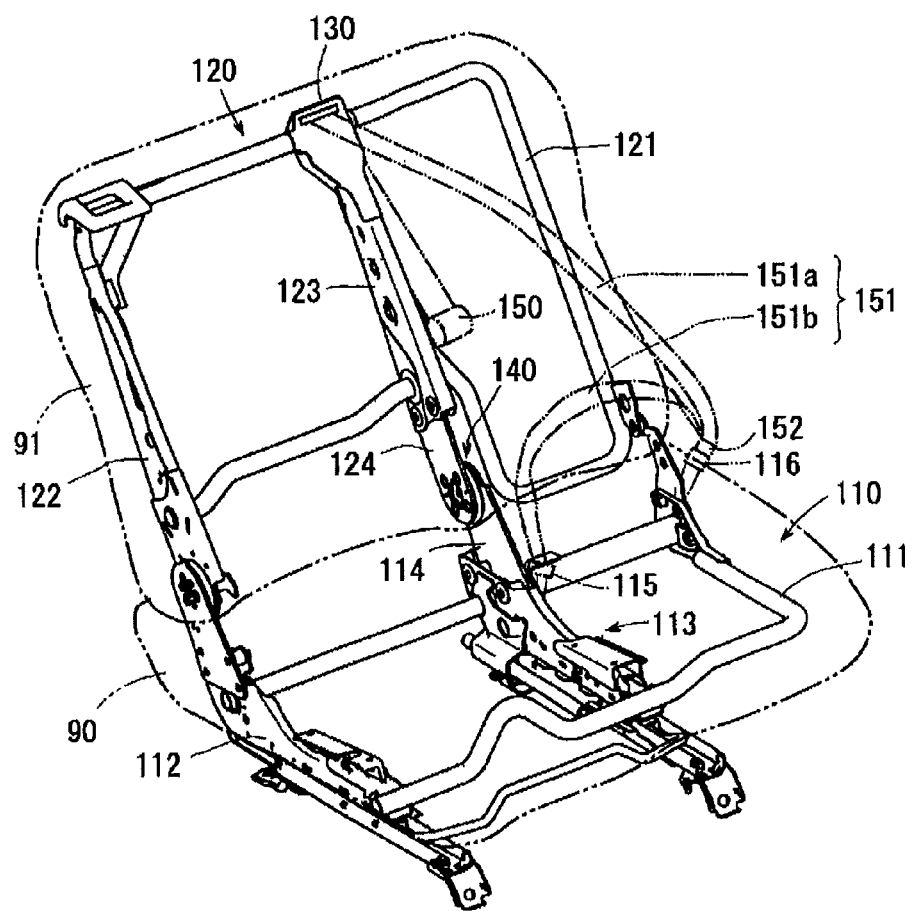
FIG. 14 is a perspective view of a conventional vehicle seat frame.

FIGS. 11 through 13 are enlarged cross sectional view and cross sectional views of the connecting portion of the back center frame 40 and the bracket 14. As shown in FIGS. 11 and 12, the base end portion side of the connecting member 60 is accommodated in the back center frame 40 and the side plate portion 40a and the parallel portion 63a, and the side plate portion 40b and the first recess portion 66 are welded.

As shown in FIG. 13, a plurality of engaging bores 68b concentrically bored in the second recess portion 68 of the connecting member 60 engages with the corresponding engaging projections 30a provided in the recliner 30. Thus the relative rotation of the recliner 30 relative to the connecting member 60 is restricted. The contact portion between the second side wall portion 64b and the recliner 30 is welded together. The recliner 30 is inserted into the bracket 14. By this structure, back center frame 40 and the bracket 14 are rotatably connected through the recliner 30. The recliner 30 exhibits a conventional structure and the explanation is omitted here.

In the vehicle seat frame according to the embodiment 3, the base portion side of the connecting member 60 is accommodated in and fixed to the hollow and quadrangular prism shaped thin back center frame 40 and the tip end portion side of the connecting member 60 and the bracket 14 (which is fastened to cushion center frame 13) are rotatably connected through the recliner 30 and accordingly, this structure can prevent the sudden change of the cross sectional surface of the connecting portion between the connecting member 60 and the bracket 14. Further, the ceiling portion 63 of the connecting member 60 and the recess portion 65 are integrally formed to prevent the weight increase. Further, since the inner surface of one 40a of the side plate portions is fixed to the base end portion side surface (parallel portion 63a) of the ceiling portion 63 and the inner surface of the other 40b of the side plate portions is fixed to the recess portion 65 (first recess portion 66), the strength against the load is assured. Accordingly, according to the vehicle seat frame of the embodiment 3, the increase of weight can be prevented and the strength can be secured.

Further, according to the vehicle seat frame, the plurality of engaging bores 68b concentrically bored in the second recess portion 68 of the connecting member 60 engages with the corresponding engaging projections 30a provided in the recliner 30. Thus the relative rotation of the recliner 30 relative to the connecting member 60 is restricted. In addition, the recliner 30 and the tip end portion of the side plate portion 40b are fixed and thus the back center frame 40 and the recliner 30 are securely fixed and accordingly the back center frame 40 and bracket 14 (which is fastened to cushion center frame 13) are securely fixed together.

Further, according to this vehicle seat frame, the ceiling portion 63 of the connecting member 60 is provided with the inclined portion 63b extending with inclination relative to the recliner 30 side from the parallel portion 63a towards the tip end portion side (the width of the second side wall portion 64b is narrowed from the base end portion side to the tip end portion side). This can enhance the strength and yet can keep a sufficient space for an occupant of the vehicle.

According to the embodiment 3, the shoulder belt anchor 27 is provided at the upper end of the seat back frame 20, however, as has been explained in the embodiments 1 and 2, the invention is not limited to this vehicle seat frame and a vehicle seat frame which has a shoulder belt anchor provided on the vehicle body may be within the invention. Further, according to the embodiment 3, the ceiling portion 63 of the connecting member 60 has the parallel portion 63a and the inclined portion 63b; however it is not necessary to have the inclined portion 63b.

The invention has been explained on the vehicle seat frame according to the embodiments 1, 2 and 3, however, the invention is not limited to these embodiments and variations and changes may be made without departing from the subject matter of the present invention.

INDUSTRIAL APPLICABILITY

The vehicle seat frame according to this invention is applicable to a vehicle seat with a recliner for adjusting a relative rotation angle between the seat cushion and the seat back rotatably connected to the seat cushion.

The invention claimed is:

1. A vehicle seat frame comprising a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a ceiling portion having a parallel portion extending in parallel with one of the opposed side plate portions, a pair of side wall portions extending vertically from both side edges of the ceiling portion, respectively and a flange portion extending from the respective tip ends of the side wall portions in parallel with the other of the opposed side plate portions and connects the seat cushion frame and the seat back frame through the recliner, wherein a base end portion side surface of the ceiling portion is fixed to an inner surface of the one of the side plate portions, a base end portion side surface of the flange portion is fixed to an inner surface of the other of the side plate portions and a tip end portion side surface of the flange portion is fixed to the recliner.

2. A vehicle seat frame comprising a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a cylindrical outer cylinder portion, a ceiling portion extending inwardly from one axial end of the outer cylinder portion and a flange portion extending outwardly from the other axial end of the outer cylinder portion and connects the seat cushion frame and the seat back frame, and wherein the connecting member is configured so that the ceiling portion is fixed to an inner surface of one of the opposed side plate portions, that a surface of a ceiling portion side of the flange portion is fixed to an outer surface of the other of the opposed side plate portions and that a surface opposite to the ceiling portion side of the flange portion is fixed to an object to be connected, which is either the seat back frame or the seat cushion frame.

3. The vehicle seat frame according to claim 2, wherein a shoulder belt anchor for supporting one end of a seat belt is provided at the seat back frame.

4. The vehicle seat frame according to claim 2, wherein the recliner is attached to the flange portion of the connecting member and the seat cushion frame and the seat back frame are connected through the recliner.

5. The vehicle seat frame according to claim 4, wherein the ceiling portion of the connecting member is formed with an annular shape and an inner cylinder portion is accommodated in an inner peripheral portion of the ceiling portion and integrally formed therewith, wherein the other axial end of the inner cylinder portion is fixed to the recliner.

6. The vehicle seat frame according to claim 5, wherein the ceiling portion of the connecting member includes an inclined portion extending with an inclination to the flange portion side from the parallel portion towards a tip end portion side.

7. A vehicle seat frame comprising a seat cushion frame adapted to support a seat cushion, a seat back frame adapted to support a seat back and a recliner rotatably connecting the seat back relative to the seat cushion and adjusting the rotation angle thereof, at least one of the seat cushion frame and the seat back frame being formed with a hollow quadrangular prism shape and having a pair of opposed side plate portions, wherein a connecting member is provided and includes a ceiling portion having a parallel portion extending in parallel with one of the opposed side plate portions, a pair of side wall portions extending vertically from both side edges of the ceiling portion, respectively and a recess portion extending from a base end portion of the ceiling portion towards a tip end portion and formed integrally therewith and connects the seat cushion frame and the seat back frame through the recliner, and wherein a base end portion side surface of the ceiling portion is fixed to an inner surface of one of the side plate portions, the recess portion is fixed to an inner surface of the other of the side plate portions and a tip end portion side surface of the recess portion is fixed to the recliner.

8. The vehicle seat frame according to claim 7, wherein the recess portion of the connecting member includes a first recess portion provided at the base end portion side, a stepped portion projecting towards the ceiling portion side from the first recess portion and a second recess portion provided at the tip end portion side consecutive with the stepped portion, the second recess portion includes a plurality of engaging bores provided concentrically in the second recess portion and that the recliner includes a corresponding number of engaging projections which are engaged with the plurality of engaging bores to restrict the rotation of the recliner relative to the connecting member, wherein the recliner and the tip end portion side of the side wall portion are fixed.

9. The vehicle seat frame according to claim 7, wherein the ceiling portion of the connecting member includes an inclined portion extending from the parallel portion to the tip end portion side with an inclination relative to the recliner side.

* * * * *